United States Patent [19]

Inoue et al.

[11] Patent Number: 5,508,854

[45] Date of Patent: Apr. 16, 1996

[54] APPARATUS FOR WRITING DATA ON A MAGNETIC CARD AND PREVENTING HEAT DAMAGE TO A MAGNETIC HEAD COIL

[75] Inventors: Akio Inoue; Mitsuhiro Okazaki; Hiroshi Sasou, all of Tokyo, Japan

[73] Assignee: Tamura Electric Works, Ltd., Japan

[21] Appl. No.: 294,962

[22] Filed: Aug. 24, 1994

[30] Foreign Application Priority Data

Aug. 26, 1993 [JP] Japan .................................. 5-232215

[51] Int. Cl.⁶ .............................. G11B 25/04; G06K 7/08
[52] U.S. Cl. ................................................. 360/2; 235/449
[58] Field of Search ......................... 360/2, 60; 235/384, 235/449, 475

[56] References Cited

U.S. PATENT DOCUMENTS

| | | | |
|---|---|---|---|
| 4,197,988 | 4/1980 | Moss et al. | 360/2 |
| 4,318,147 | 3/1982 | Nomura | 360/2 |
| 4,988,854 | 1/1991 | Mita | 360/2 |
| 5,421,463 | 6/1995 | Okazaki et al. | 209/559 |

Primary Examiner—Aristotelis Psitos
Assistant Examiner—Regina Y. Neal
Attorney, Agent, or Firm—Remy J. VanOphem; John VanOphem

[57] ABSTRACT

A data write apparatus includes a card conveyor path, a recording head, a sensor circuit, a Central Processing Unit (CPU), a drive circuit, and an enable section. A magnetic card is conveyed in the card conveyor path. The recording head is arranged on the card conveyor path and performs a recording operation on the magnetic card by energizing a winding coil. The sensor circuit is arranged on the card conveyor path near the recording head and detects the magnetic card conveyed in the card convey or path to output a detection signal. The CPU outputs write data to be written on the magnetic card in response to the detection signal from the sensor circuit. The drive circuit energizes the winding coil of the recording head on the basis of the write data from the CPU to perform the recording operation. The enable section enables the drive circuit for a predetermined time after the write data is output from the CPU to limit energization of the winding coil of the magnetic head to a time equal to or less than the predetermined time.

5 Claims, 4 Drawing Sheets

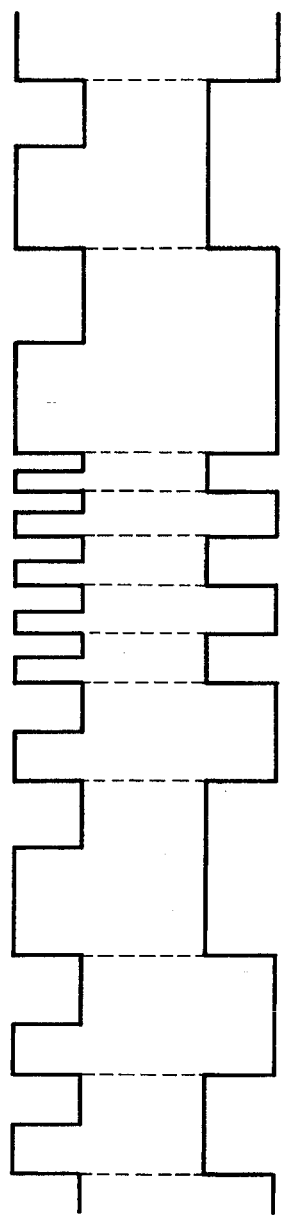
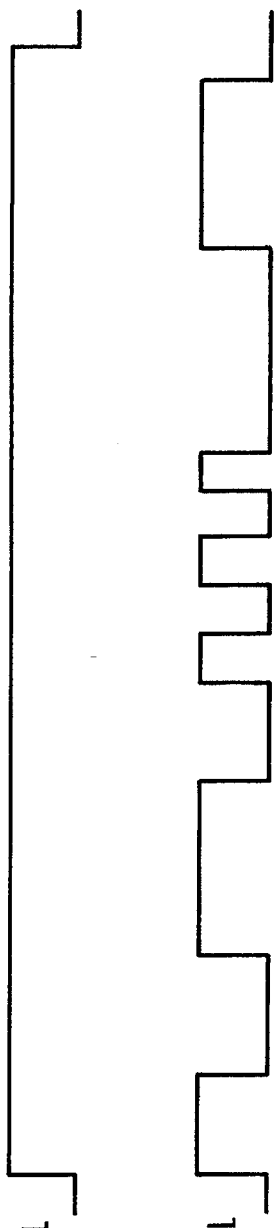
FIG.2A  WRITE CLOCK
FIG.2B  WRITE DATA WD
FIG.2C  TIMER SIGNAL TM
FIG.2D  WRITE SIGNAL WR

APPARATUS FOR WRITING DATA ON A MAGNETIC CARD AND PREVENTING HEAT DAMAGE TO A MAGNETIC HEAD COIL

BACKGROUND OF THE INVENTION

1. Field of the Invention

The present invention relates to a data write apparatus for writing data on a magnetic card.

2. Description of the Prior Art

A magnetic head for magnetically recording/reproducing data on/from a magnetic card has the arrangement shown in FIG. 4. Referring to FIG. 4, reference numeral 1 denotes a recording head for recording data; 2, a reproducing head 2 for reproducing data; and 3, a gap formed between magnetic cores 1a and 2a of the recording head 1 and the reproducing head 2. In this case, when a current corresponding to write data is caused to flow into a winding coil 1b of the recording head 1, a magnetic field is generated by the gap 3, and the write data is recorded on a magnetic track of a magnetic card 4 conveyed on the card conveyor path 5.

FIG. 5A shows a conventional data write apparatus, and FIG. 5B shows the arrangement relationship between the recording head and a sensor shown in FIG. 5A. As shown in FIG. 5B, the recording head 1 is arranged in the card conveyor path 5 in which the magnetic card 4 is conveyed, and a sensor 11 connected to a sensor circuit 12 is arranged in the card conveyor path 5 near the recording head 1. When the sensor circuit 12 receives a signal indicating that the sensor 11 detects the magnetic card 4, a detection output from the sensor circuit 12 is supplied to a CPU (Central Processing Unit) 10 and one input terminal of an AND circuit 13. On the other hand, when the CPU 10 receives the detection output of the magnetic card 4 from the sensor circuit 12, the CPU 10 drives a drive circuit 14 to cause the recording head 1 to write data on the magnetic card 4.

In this case, the CPU 10 supplies the write data to the other input terminal of the AND circuit 13 on the basis of a write clock generated by an output from an encoder (not shown) operated in synchronism with the convey speed of the magnetic card 4. In the AND circuit 13, the logical product between the detection output of the magnetic card 4 from the sensor circuit 12 and the write data from the CPU 10 is calculated, and the logical product output is supplied to the drive circuit 14 to energize the winding coil 1b of the recording head 1. As a result, the data is written on a magnetic track of the magnetic card 4.

In the conventional data write apparatus, when the magnetic card 4 is detected by the sensor 11, the AND circuit 13 supplies the write data from the CPU 10 to the drive circuit 14, thereby energizing the recording head 1. A current caused to flow into the winding coil 1b of the recording head 1 is a larger current than 1 A. For this reason, when the magnetic card 4 is jammed in the conveyor path to set a situation wherein the magnetic card 4 is continuously detected for a long time, the winding coil 1b of the recording head 1 is energized at a large current for a long time by the write data from the CPU 10. In this case, the winding coil 1b of the recording head 1 generates heat to melt the coating of the winding coil 1b. As a result, short-circuiting occurs in the coil 1b, so that the recording head 1 becomes disabled.

SUMMARY OF THE INVENTION

It is an object of the present invention to provide a data write apparatus in which the winding coil of a recording head is prevented from generating heat to prevent the recording head from being damaged.

In order to achieve the above object, according to the present invention, there is provided a data write apparatus including a card conveyor path in which a magnetic card is conveyed, a recording head, arranged on the card conveyor path, for performing a recording operation on the magnetic card by energizing a winding coil, sensor means, arranged on the card conveyor path near the recording head, for detecting the magnetic card conveyed in the card conveyor path to output a detection signal, write control means for outputting write data to be written on the magnetic card in response to the detection signal from the sensor means, drive means for energizing the winding coil of the recording head on the basis of the write data from the write control means to perform the recording operation, and enable means for enabling the drive means for a predetermined time after the write data is output from the write control means to limit energization of the winding coil of the magnetic head to a time equal to or less than the predetermined time.

BRIEF DESCRIPTION OF THE DRAWINGS

FIGS. 2A to 2D are timing charts showing the timings of the parts of the data write apparatus shown in FIG. 1;

DESCRIPTION OF THE PREFERRED EMBODIMENTS

The present invention will be described below with reference to the accompanying drawings.

Figure 1:
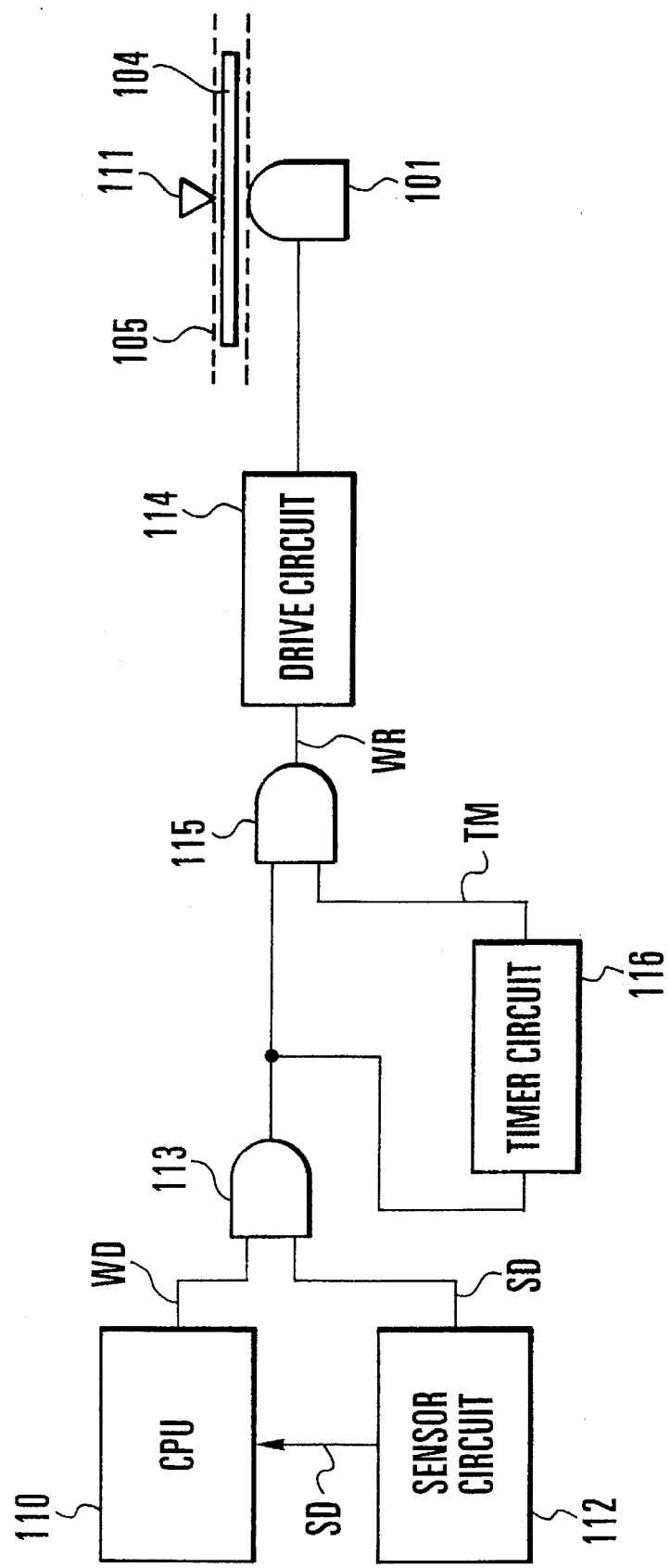
FIG. 1 is a block diagram showing a data write apparatus according to an embodiment of the present invention.

FIG. 1 shows a data write apparatus according to an embodiment of the present invention. Referring to FIG. 1, reference numeral 101 denotes a recording head arranged in a card conveyor path; 112, a sensor circuit, including a sensor 111 arranged in a card conveyor path 105 near the recording head 101, for outputting a card detection signal SD having a predetermined time interval and generated by the sensor 111; 110, a CPU for receiving the card detection signal SD from the sensor circuit 112 as an input and outputting write data WD; 113, an AND circuit for receiving the write data WD from the CPU 110 and the card detection signal SD from the sensor circuit 112 as two inputs and outputting the write data WD; 116, a timer circuit for starting a timer operation in response to the write data WD from the AND circuit 113 and outputting a timer signal TM having a predetermined time during the timer operation; 115, an AND circuit for receiving the write data WD from the AND circuit 113 and the timer signal TM from the timer circuit 116 as two inputs and outputting a write signal WR; and 114, a drive circuit for receiving the write signal WR as an input and outputting a head drive signal to the recording head 101.

The operation of the data write apparatus arranged as described above will be generally described below.

The recording head 101 is arranged together with the sensor 111 in the card conveyor path 105 in which the magnetic card 104 is conveyed as described above. When the sensor circuit 112 receives a signal indicating that the sensor 111 detects the magnetic card 104, the sensor circuit 112 supplies the detection signal SD to the CPU 110 and one input terminal of the AND circuit 113. On the other hand, the CPU 110 receives the detection signal SD of the magnetic card 104 from the sensor circuit 112. If there is data to be recorded on the magnetic card 104, the CPU 110 outputs the write data WD to the other input terminal of the AND circuit 113.

In this case, since the AND circuit 113 has received the detection signal SD having a predetermined time interval, the write data WD is output from the AND circuit 113 to one input terminal of the AND circuit 115. At the same time, the timer circuit 116 is started in response to the write data WD from the AND circuit 113, and the timer signal TM kept at "H" level for a predetermined time is output to the other input terminal of the AND circuit 115. As a result, the logical product between the signals input to the two input terminals of the AND circuit 115 is output from the AND circuit 115. More specifically, the write data WD is output from the AND circuit 115 as the write signal WR for a predetermined time defined by the timer circuit 116, and this write signal WR is supplied to the drive circuit 114. The drive circuit 114 energizes the winding coil of the recording head 101 on the basis of the input write signal WR, thereby recording the data on the magnetic card 104.

FIGS. 2A to 2D show the timings of the parts of the data write apparatus. The detailed operation of this apparatus will be described below on the basis of the timing charts shown in FIGS. 2A to 2D. While the magnetic card 104 is detected by the sensor 111, the detection signal SD from the sensor circuit 112 is set at "H" level to supply the detection signal SD to the CPU 110 and one input terminal of the AND circuit 113. On the other hand, the CPU 110 detects this detection signal SD. If there is data to be written on the magnetic card 104, the CPU 110 outputs the write data WD (FIG. 2B) synchronized with a write clock (FIG. 2A) to the other input terminal of the AND circuit 113.

The above write clock is normally generated in synchronism with a card convey speed of, e.g., 300 mm/sec, detected by an encoder (not shown). The write data WD synchronized with this write clock is output from the CPU 110 to the AND circuit 113.

At this time, since one input of the AND circuit 113 is set at "H" level, the write data WD is output from the AND circuit 113 to one input terminal of the AND circuit 115. The timer circuit 116 is started in response to the write data WD, and the timer signal TM (FIG. 2C) kept at "H" level for a predetermined time is output to the other input terminal of the AND circuit 115. In this case, the timer signal TM having a predetermined time output from the timer circuit 116 is defined on the basis of a card convey speed.

While the timer signal TM output from the timer circuit 116 and input to the other input terminal of the AND circuit 115 is kept at "H" level, the AND circuit 115 outputs the write data WD input from one input terminal thereof to the drive circuit 114 as the write signal WR shown in FIG. 2D. As a result, the drive circuit 114 energizes the winding coil of the recording head 101 on the basis of the write signal WR, and the winding coil is energized by the write signal WR for the predetermined time defined by the timer signal TM. Therefore, since a large current is not caused to flow into the winding coil for a time longer than the timer time, the winding coil of the recording head 101 can be prevented from generating heat.

Figure 3:
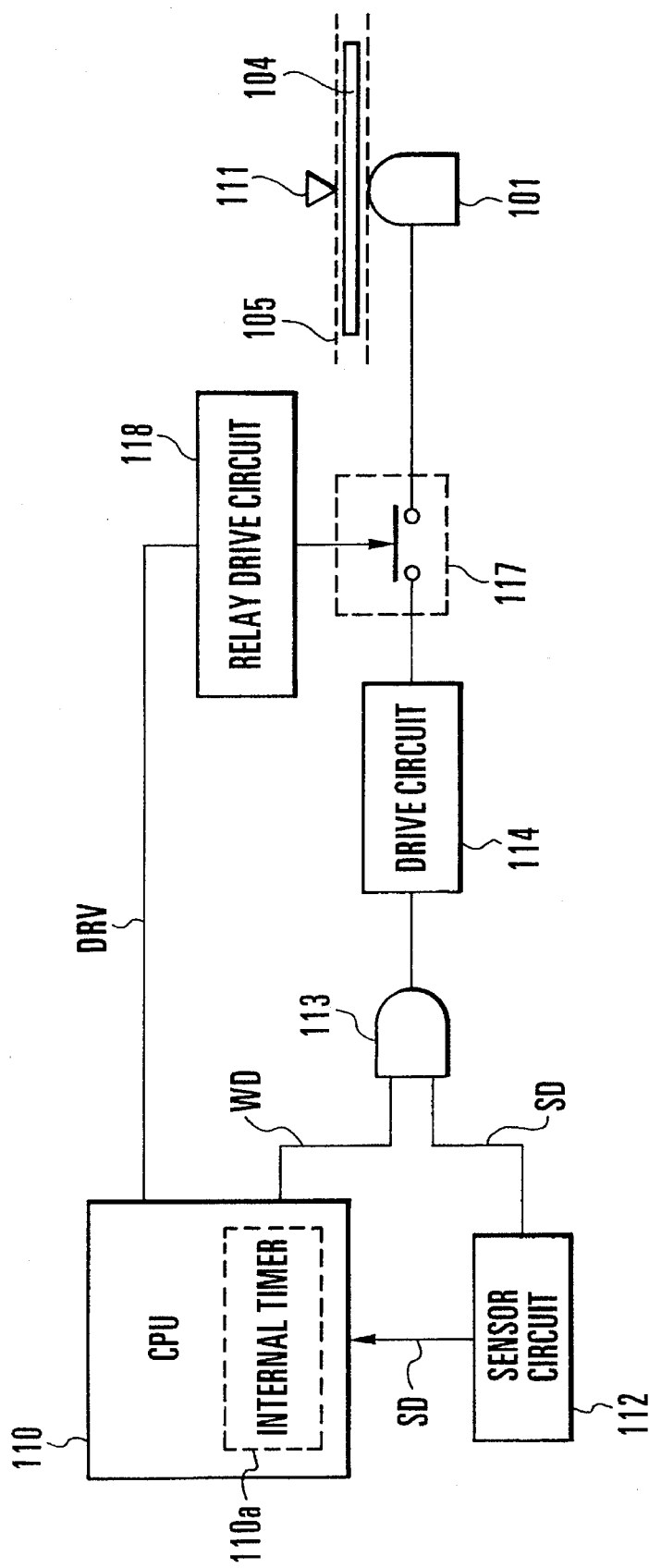
FIG. 3 is a block diagram showing a data write apparatus according to another embodiment of the present invention.
Figure 4:
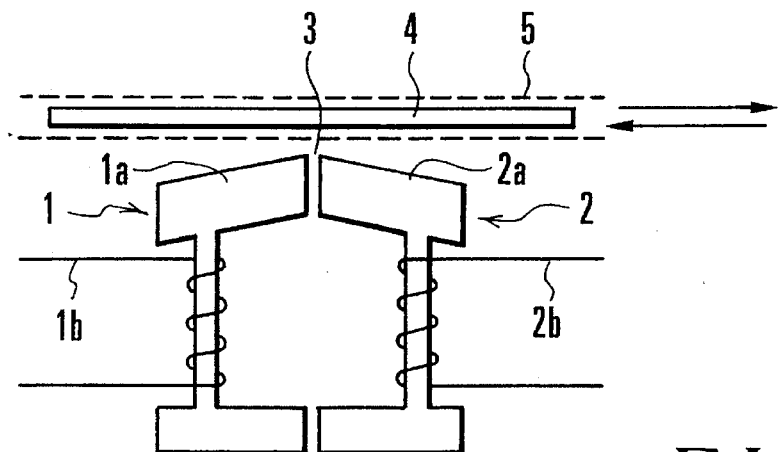
FIG. 4 is a view showing a general arrangement of a magnetic head.
Figure 5A:
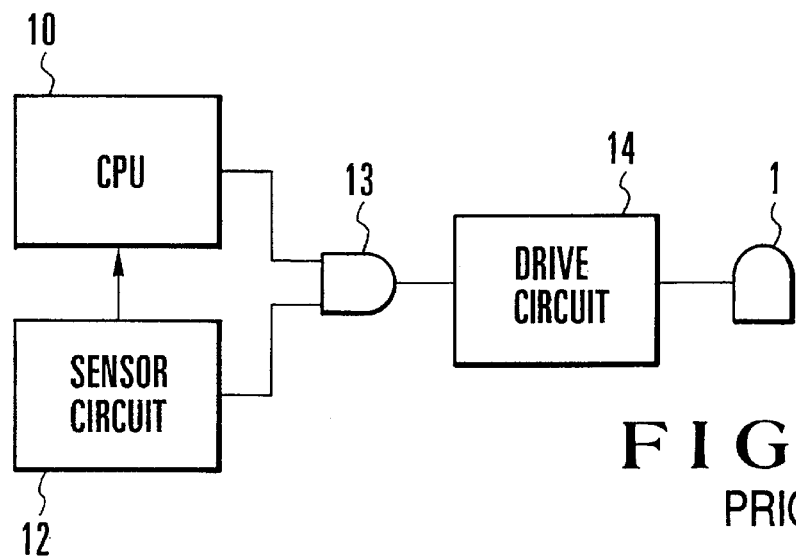
FIG. 5A is a block diagram showing a conventional data write apparatus.
Figure 5B:
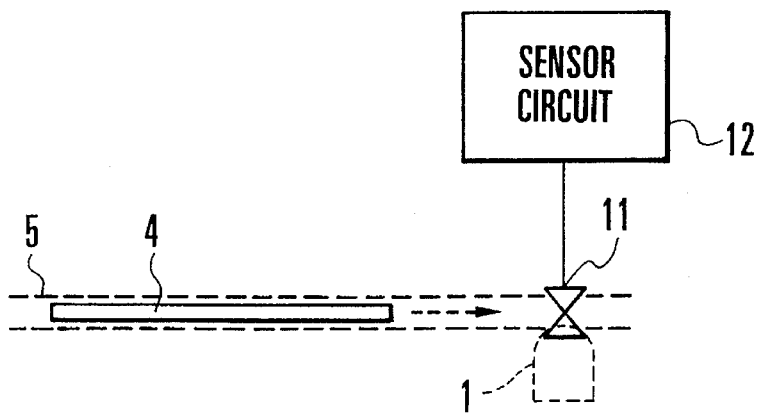
FIG. 5B is a view showing the arrangement relationship between the head and sensor shown in FIG. 5A.

FIG. 3 shows a data write apparatus according to another embodiment of the present invention. In this embodiment, unlike the embodiment shown in FIG. 1, an AND circuit 115 and a timer circuit 116 are omitted, and a relay 117 having a relay contact connected across a drive circuit 114 and a recording head 101, and a relay drive circuit 118 for receiving a drive signal DRV from a CPU 110 and driving the relay 117, are added. In addition, in the embodiment of FIG. 3, the CPU 110 embodies an internal timer 110a. In this arrangement, when write data WD is to be output on the basis of a detection signal SD indicating detection of a magnetic card 104, the CPU 110 starts the internal timer 110a and outputs the drive signal DRV to the relay drive circuit 118 to close the contact of the relay 117. The CPU 110 stops the drive signal DRV when a predetermined time defined on the basis of an output from the internal timer 110a for counting write clocks has elapsed, thereby opening the contact of the relay 117. In this manner, since the drive circuit 114 is physically disconnected from the recording head 101 a predetermined time after a recording operation is started, the winding coil of the recording head 101 is not energized by the drive circuit 114 for a long time. Therefore, as in the embodiment in FIG. 1, the winding coil can be prevented from generating heat. In addition, since the drive signal DRV is controlled by the internal timer 110a, an energization time for the recording head 101 can be managed by the CPU 110.

As has been described above, according to the present invention, a head is energized a predetermined time after a recording operation on a card is started, so that data is written on the card. For this reason, the head is not energized for a time longer than the predetermined time. Therefore, the head can be prevented from generating heat, and the head can be advantageously prevented from being damaged.

What is claimed is:

1. A data write apparatus comprising:

a card conveyor path in which a magnetic card is conveyed;

a recording head, arranged on said card conveyor path and comprising a winding coil, for performing a recording operation on said magnetic card by energizing said winding coil;

sensor means, arranged on said card conveyor path near said recording head, for detecting said magnetic card conveyed in said card conveyor path to output a detection signal;

write control means for outputting write data to be written on said magnetic card in response to said detection signal from said sensor means;

drive means for energizing said winding coil of said recording head on the basis of said write data from said write control means to perform said recording operation; and enable means for enabling said drive means for a predetermined time after said write data is output from said write control means to limit energization of said winding coil of said magnetic head to a time not longer than said predetermined time, said enable means comprising timer means for starting a time measuring operation of said predetermined time by receiving said write data from said write control means, said timer means further comprising stop means for stopping said timer means at the end of said predetermined time, and first gate means through which said write data from said write control means is transmitted during said time measuring operation of said timer means to output said write data to said drive means.

2. An apparatus according to claim 1, further comprising second gate means, through which said write data from said write control means is transmitted for said predetermined time for which said detection signal is output from said sensor means, for outputting said write data to said timer means and said first gate means.

3. An apparatus according to claim 2, wherein said first gate means comprises a first AND circuit for receiving an output from said second gate means and a timer signal from said timer means as two inputs, and wherein said second gate means comprises a second AND circuit for receiving said write data from said write control means and said detection signal from said sensor means as two inputs.

4. A data write apparatus comprising:

a card conveyor path in which a magnetic card is conveyed;

a recording head, arranged on said card conveyor path and comprising a winding coil, for performing a recording operation on said magnetic card by energizing said winding coil;

sensor means, arranged on said card conveyor path near said recording head, for detecting said magnetic card conveyed in said card conveyor path to output a detection signal;

write control means for outputting write data to be written on said magnetic card in response to said detection signal from said sensor means;

drive means for energizinq said winding coil of said recording head on the basis of said write data from said write control means to perform said recording operation; and enable means for enabling said drive means for a predetermined time after said write data is output from said write control means to limit energization of said winding coil of said magnetic head to a time not longer than said predetermined time, said enable means comprising switching means for opening and closing a connection line between said drive means and said recording head, and timer means for outputting a drive control signal for said predetermined time in accordance with said detection signal from said sensor means, said switchinq means being closed only during said predetermined time on the basis of said drive control signal from said timer means.

5. A data write apparatus comprising:

a card conveyor path in which a magnetic card is conveyed;

a recording head, arranged on said card conveyor path and comprising a winding coil, for performing a recording operation on said magnetic card by energizing said winding coil;

sensor means, arranged on said card conveyor path near said recording head, for detecting said magnetic card conveyed in said card conveyor path to output a detection signal having a predetermined time interval;

write control means for outputting write data to be written on said magnetic card in response to said detection signal from said sensor means;

second gate means through which said write data from said write control means is transmitted while said detection signal is output from said sensor means;

timer means for starting a time measuring operation of a predetermined time by receiving said write data from said second gate means said timer means further comprising stop means for stopping said timer means at the end of said predetermined time;

first gate means for outputting said write data from said second gate means during said time measuring operation of said timer means; and drive means for energizing said winding coil of said recording head only durinq said predetermined time on the basis of said write data from said first gate means to perform said recording operation.

* * * * *

UNITED STATES PATENT AND TRADEMARK OFFICE
CERTIFICATE OF CORRECTION

PATENT NO. : 5,508,854
DATED : Apr. 16, 1996
INVENTOR(S) : Inoue et al.

It is certified that error appears in the above-indentified patent and that said Letters Patent is hereby corrected as shown below:

Title Page, item [57], line 2, delete "Central Processing Unit" insert ---- central processing unit ----.

Title Page, item [57], line 9, delete "convey or" insert ---- conveyor ----.

Column 6, line 4, delete "switchinq" insert ---- switching ----.

Column 6, line 29, after "means", first occurrence insert ---- , ----.

Column 6, line 36, delete "durinq" insert ---- during ----.

Signed and Sealed this

Third Day of September, 1996

Attest:

BRUCE LEHMAN

*Attesting Officer*  *Commissioner of Patents and Trademarks*